US008775671B2

(12) United States Patent
Rodeck et al.

(10) Patent No.: US 8,775,671 B2
(45) Date of Patent: Jul. 8, 2014

(54) MANAGING INFORMATION EXCHANGE BETWEEN BUSINESS ENTITIES

(75) Inventors: Marco Rodeck, Maikammer (DE); Harish Mehta, Walldorf (DE); Thomas Kunz, Lobbach/Lobenfeld (DE); Florian Chrosziel, Wiesloch (DE); Otto Böhrer, Wiesloch (DE); Joerg Kraemer, Sinsheim (DE); Rita Merkel, Ilvesheim (DE)

(73) Assignee: SAP AG, Walldorf (DE)

(*) Notice: Subject to any disclaimer, the term of this patent is extended or adjusted under 35 U.S.C. 154(b) by 85 days.

(21) Appl. No.: 13/469,517

(22) Filed: May 11, 2012

(65) Prior Publication Data

US 2013/0304936 A1  Nov. 14, 2013

(51) Int. Cl.
G06F 15/173 (2006.01)
(52) U.S. Cl.
USPC ............................ 709/238; 709/201; 709/203
(58) Field of Classification Search
USPC ......... 709/201–203, 217, 219, 230–232, 238, 709/242, 243, 24; 705/50–59, 64–80, 705/1.1–4, 7.29–7.36, 26.1–26.44, 28–29, 705/35–45, 300–309, 313–318, 330–341
See application file for complete search history.

(56) References Cited

U.S. PATENT DOCUMENTS

| | | | |
|---|---|---|---|
| 6,532,465 B2 * | 3/2003 | Hartley et al. | 707/610 |
| 7,171,478 B2 * | 1/2007 | Lueckhoff et al. | 709/227 |
| 7,325,076 B1 * | 1/2008 | Morrison et al. | 709/246 |
| 7,457,792 B2 | 11/2008 | Weigt et al. | |
| 7,457,793 B2 * | 11/2008 | Weigt et al. | 706/47 |
| 7,457,794 B2 | 11/2008 | Weigt et al. | |
| 7,587,386 B2 | 9/2009 | Rabetge et al. | |
| 7,640,264 B1 * | 12/2009 | Chaulk et al. | 1/1 |
| 7,734,497 B2 * | 6/2010 | Kelley et al. | 705/7.35 |
| 7,742,973 B2 * | 6/2010 | Samsky et al. | 705/37 |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 8,006,245 B2 * | 8/2011 | Chandel | 718/102 |
| 8,051,034 B2 | 11/2011 | Mehta et al. | |
| 8,112,747 B2 * | 2/2012 | Haeberle et al. | 717/172 |
| 8,204,790 B1 * | 6/2012 | Rogers et al. | 705/26.1 |
| 8,266,670 B1 * | 9/2012 | Merkow et al. | 726/1 |
| 8,332,378 B2 * | 12/2012 | Clayton et al. | 707/706 |
| 8,364,720 B2 * | 1/2013 | Levy | 707/803 |
| 8,473,604 B2 * | 6/2013 | Misra et al. | 709/224 |
| 2006/0015450 A1 * | 1/2006 | Guck et al. | 705/39 |
| 2008/0288549 A1 | 11/2008 | Rabetge et al. | |
| 2008/0313189 A1 | 12/2008 | Mehta et al. | |

(Continued)

*Primary Examiner* — Hassan Kizou
*Assistant Examiner* — Phyllis Book
(74) *Attorney, Agent, or Firm* — Fish & Richardson P.C.

(57) ABSTRACT

Techniques for managing information exchange between business entities include identifying a plurality of routing rules stored in a database of a first business entity computing system; receiving a request for a business transaction through an application of a plurality of applications of the first business entity computing system; determining, based on the identified routing rules, an identifiable business context reference (IBCR) associated with a second business entity computing system, the IBC comprising a unique identifier associated with the second business entity and a first plurality of business data attributes associated with the second business entity; determining, based on the identified IBCR, a communication connection associated with the IBC and an identifiable business context (IBC) associated with the first business entity computing system; and initiating the business transaction between the first business entity computing system and the second business entity computing system through the determined communication connection.

18 Claims, 12 Drawing Sheets

(56) References Cited

U.S. PATENT DOCUMENTS

| | | | |
|---|---|---|---|
| 2009/0080408 A1* | 3/2009 | Natoli et al. | 370/351 |
| 2010/0161712 A1* | 6/2010 | Mehta et al. | 709/203 |
| 2011/0077999 A1* | 3/2011 | Becker et al. | 705/10 |
| 2011/0265142 A1* | 10/2011 | Vasconi et al. | 726/1 |
| 2012/0036360 A1* | 2/2012 | Bassu et al. | 713/168 |
| 2012/0089534 A1* | 4/2012 | Liebig et al. | 705/348 |

\* cited by examiner

FIG. 3A

Identifiable Business Context

/ Edit ▭ Save ✗ Cancel ▭ Export ▭ Local IBCR ✂ Local IBCR

General Data

| ID: | 005056A5037A1EE195FA63825D0607AB | 302 | Description: | Company Code 0100-CompanyA US | 304 |
| Receiver Type: | Company Code | 306 | Valid From: | 01.01.2012 | 00:00:00 | 312 |
| Receiver Name: | 0100 | 308 | Valid To: | 31.12.9999 | 23:59:59 | 314 |
| Application Component: | | | | |
| Class Name: | ZCL_ZZMR_IBC_APPL_WERKS | 310 | 316 |

Descriptions

▭ Create / Edit ⊗ Delete

| Language | Description |
| EN | Company Code 0100-CompanyA US |
| DE | Buchungskreis 0100-CompanyA US |

318

Contact Details

Business Contact Details

▭ Create / Edit ⊗ Delete

Name: Bert Smith

Telephone Numbers

▭ Create / Edit ⊗ Delete

| Default | Number |
| ☑ | 001-800-706-5555 |

Mail Addresses

🗐 Create  ✏ Edit  🗑 Delete

| Default | Address |
|---|---|
| ✓ | bert@CompanyA.com |

Technical Contact Details — 320

Name: John    Bell

Telephone Numbers

🗐 Create  ✏ Edit  🗑 Delete

| Default | Number |
|---|---|
| ✓ | 001-800-706-5556 |

Mail Addresses

🗐 Create  ✏ Edit  🗑 Delete

| Default | Address |
|---|---|
| ✓ | john@CompanyA.com |

Administrative Data

IBC URLs — 322

FROM FIG. 3A

FROM FIG. 3B

300

| URL for ID: | http://bld-cust100.wdf.xyz.corp:1080/xyz/bc/srt/ibc/id_005056A5037A1EE195FA63825D0607AB?xyz-vhost=bld-cust100.wdf.xyz.corp |
| | http://bld-cust100.wdf.xyz.corp:1080/xyz/bc/srt/ibc/id_005056A5037A1EE195FA63825D0607AB?xyz-vhost=bld-cust100.wdf.xyz.corp |
| URL for IBC: | http://bld-cust100.wdf.xyz.corp:1080/xyz/bc/srt/ibc/receiver_type_bukrs_receiver_name_100?xyz-vhost=bld-cust100.wdf.xyz.corp |
| | http://bld-cust100.wdf.xyz.corp:1080/xyz/bc/srt/ibc/receiver_type_bukrs_receiver_name_100?xyz-vhost=bld-cust100.wdf.xyz.corp |

Notes

Create / Edit  ⊘ Delete

⎯ 324

| Text ID | Language | Text |
|---|---|---|
| Administrative Information | EN | IBC for CompanyA United States |
| Technical Information | EN | created by John for Demo Purpose only |
| Miscellaneous Information | EN | as example for US colleagues |

FIG. 4A

Identifiable Business Context Reference ⓘ Help ⏎ Back

Edit ☐ Save ✕ Cancel [xml] Export 🔍 Local IBC

General Data

ID: 005056A5037A1EE195FA63825D0607AB — 402
Receiver Type: Company Code — 406   Description: Company Code 0100 - CompanyA US — 404
Receiver Name: 0100 — 408   Valid From: 01.01.2012   412 — 00:00:00
Receiver System: bld-cust100.wdf.xyz.corp   Valid To: 31.12.9999   414 — 23:59:59
Application Component:                                        — 410       — 416

Usages

☐ Create 🗑 Delete

| Alias Receiver Type | Alias Receiver Name | Class Name | Application Component |
|---|---|---|---|
| Business Partner | COMPANYA_AMERICAS | ZCL_FC_IBCR_APPL1 | |

— 418

Assignment

Assign  Unassign

System: Automatically created for Domain System 'bld-cust100.wdf.xyz.corp'   Description: Automatically created for
                                                                              Type: Central
                                                                              Status: Active

Assignment Administrative Data

Descriptions

Create / Edit  Delete  — 420

| Language | Description |
|---|---|
| DE | Buchungskreis 0100-CompanyA US |
| EN | Company Code 0100-CompanyA US |

Contact Details

Business Contact Details

Name: Bert  Smith  — 422

Telephone Numbers

Create / Edit  Delete

| Default | Number |
|---|---|
| ✓ | 001-800-706-5555 |

Mail Addresses

Create / Edit  Delete

| Default | Address |
|---|---|
| ✓ | bert@CompanyA.com |

FROM FIG. 4A

Technical Contact Details

Name: John    Bell    — 424

Telephone Numbers

Create / Edit / Delete

| Default | Number |
|---|---|
| ✓ | 001-800-706-5556 |

Mail Addresses

Create / Edit / Delete

| Default | Address |
|---|---|
| ✓ | john@CompanyA.com |

Administrative Data

IBCR Notes — 426

Create / Edit / Delete

| Text ID | Language | Text |
|---|---|---|
| Administrative Information | EN | IBCR Reference for Business Partner CompanyA Americas (which points to IBC of Company Code 0100 which is CompanyA US |

FROM FIG. 4B

TO FIG. 4D

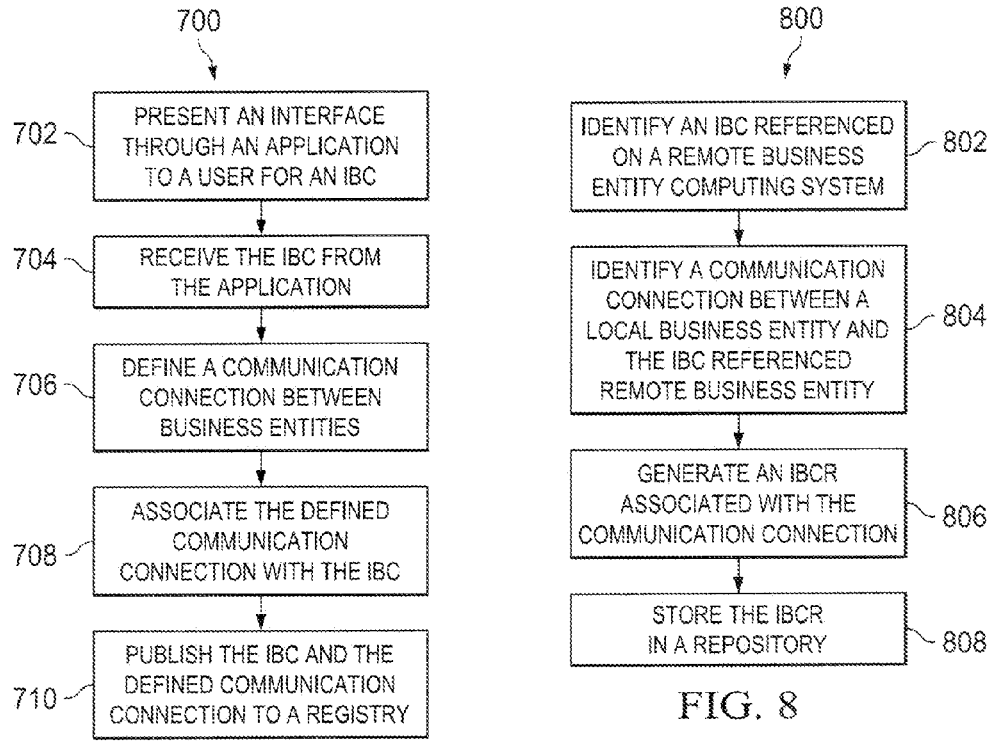
FIG. 7
FIG. 8
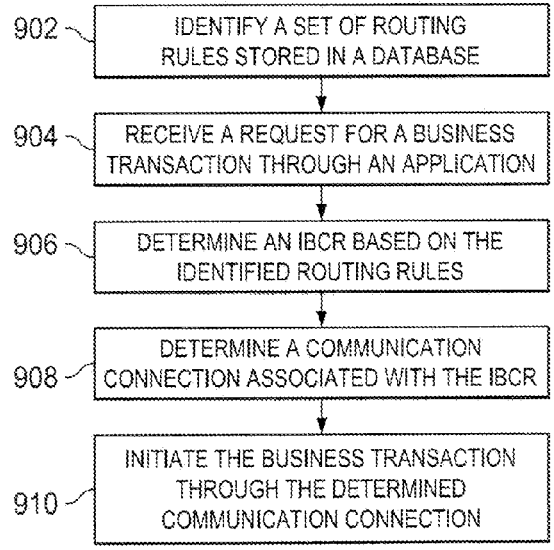
FIG. 9

MANAGING INFORMATION EXCHANGE BETWEEN BUSINESS ENTITIES

TECHNICAL BACKGROUND

This disclosure relates to managing an exchange of information and, more particularly, managing an exchange of information between two or more business entities.

BACKGROUND

In business applications, it is often necessary for business entities in one computing system to communicate with business entities that reside in a different computing system for an exchange of information. For instance, a sales department of a company may need to communicate with an external customer for business advertisement, or a manufacturing company may need to contact a vendor for business supply purchases. Typically, logical addressing is possible to locate an entity within the same computing system. However, for an application to address business entities that are located in other computing systems, direct logical addressing may not be feasible. Routing information has to be configured to connect to other computing systems that host the business entities. Information on the sender and recipient business entities would be included in the payload message to identify the business entities in the computing systems. Moreover, the routing information would need to be updated whenever technical infrastructure for other computing systems changes.

SUMMARY

One or more general embodiments for managing information exchange between business entities include identifying a plurality of routing rules stored in a database of a first business entity computing system; receiving a request for a business transaction through an application of a plurality of applications of the first business entity computing system; determining, based on the identified routing rules, an identifiable business context reference (IBCR) associated with a second business entity computing system, the IBCR comprising a unique identifier associated with the second business entity and a first plurality of business data attributes associated with the second business entity; determining, based on the identified IBCR, a communication connection associated with an identifiable business context (IBC) and the IBC associated with the first business entity computing system; and initiating the business transaction between the first business entity computing system and the second business entity computing system through the determined communication connection.

A first aspect combinable with any of the general embodiments includes prior to identifying the plurality of routing rules, receiving the routing rules through the application of the plurality of applications of the first business entity computing system.

In a second aspect combinable with any of the previous aspects, the IBCR is one of a plurality of IBCRs, and each IBCR is associated with a unique business entity computing system of a plurality of business entity computing systems comprising the second business entity computing system.

In a third aspect combinable with any of the previous aspects, determining, based on the identified routing rules, an IBCR associated with a second business entity computing system comprises comparing the routing rules to each IBCR associated with a corresponding one of the plurality of business entity computing systems; determining the IBCR associated with the second business entity computing system based on the comparison; and identifying the IBCR associated with the second business entity computing system to a user through the application.

In a fourth aspect combinable with any of the previous aspects, the plurality of routing rules comprise at least one rule comprising a product type associated with the second business entity computing system; and at least one rule comprising a delivery criteria associated with the second business computing system.

A fifth aspect combinable with any of the previous aspects includes identifying a logical port of the second business entity computing system based on the IBCR.

In a sixth aspect combinable with any of the previous aspects, the communication connection comprises a communication protocol defined by one of web service protocol, a REST protocol, an iTalk communication protocol, an HTTP protocol, an HTTPS, an SMTP protocol, or a Fast Common Gateway Interface (FastCGI) protocol.

In a seventh aspect combinable with any of the previous aspects, the unique identifier and the first plurality of business data attributes are defined in an XML data object.

Various embodiments of an identifiable business context (IBC) framework in accordance with the present disclosure may include one, some, or all of the following features. For example, the IBC framework may facilitate communications between business entities in different computing systems by allowing the business entities to be addressed outside of system borders. Further, communication connections based on the routing rules can be set on a business level (e.g., logical representation of business entities are determined based on routing rules) to address business entities, using the IBC framework, regardless of which system hosts the business entities. As a result, the logical routing information of communication connections are independent from the physical addresses of the business entities, and would be maintained the same irrespective of the change of technical configurations. Therefore, maintenance and update of the communication connections are simplified in situations when the technical infrastructure of the computing systems change. For another example, the communication connections based on the IBC framework can be established in a secure manner, as the business entities involved in the connections may be authenticated in the target computing system at an initial stage of connection setup, whereas the conventional scheme in absence of the IBC framework would include the identification of business entities in the payload information which makes the authentication difficult to be implemented.

These general and specific aspects can be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIGS. 3A-3C illustrate an example IBC object presented through a user interface;

FIGS. 4A-4D illustrate an example identifiable business context reference (IBCR) object presented through a user interface;

FIG. 7 illustrates an example method implemented with an IBC for information exchange between business entities;

FIG. 8 illustrates an example method implemented with an IBCR for information exchange between business entities; and FIG. 9 illustrates an example method implemented with an IBC framework for determining a logical receiver in association with a set of routing rules.

DETAILED DESCRIPTION

Figure 1:
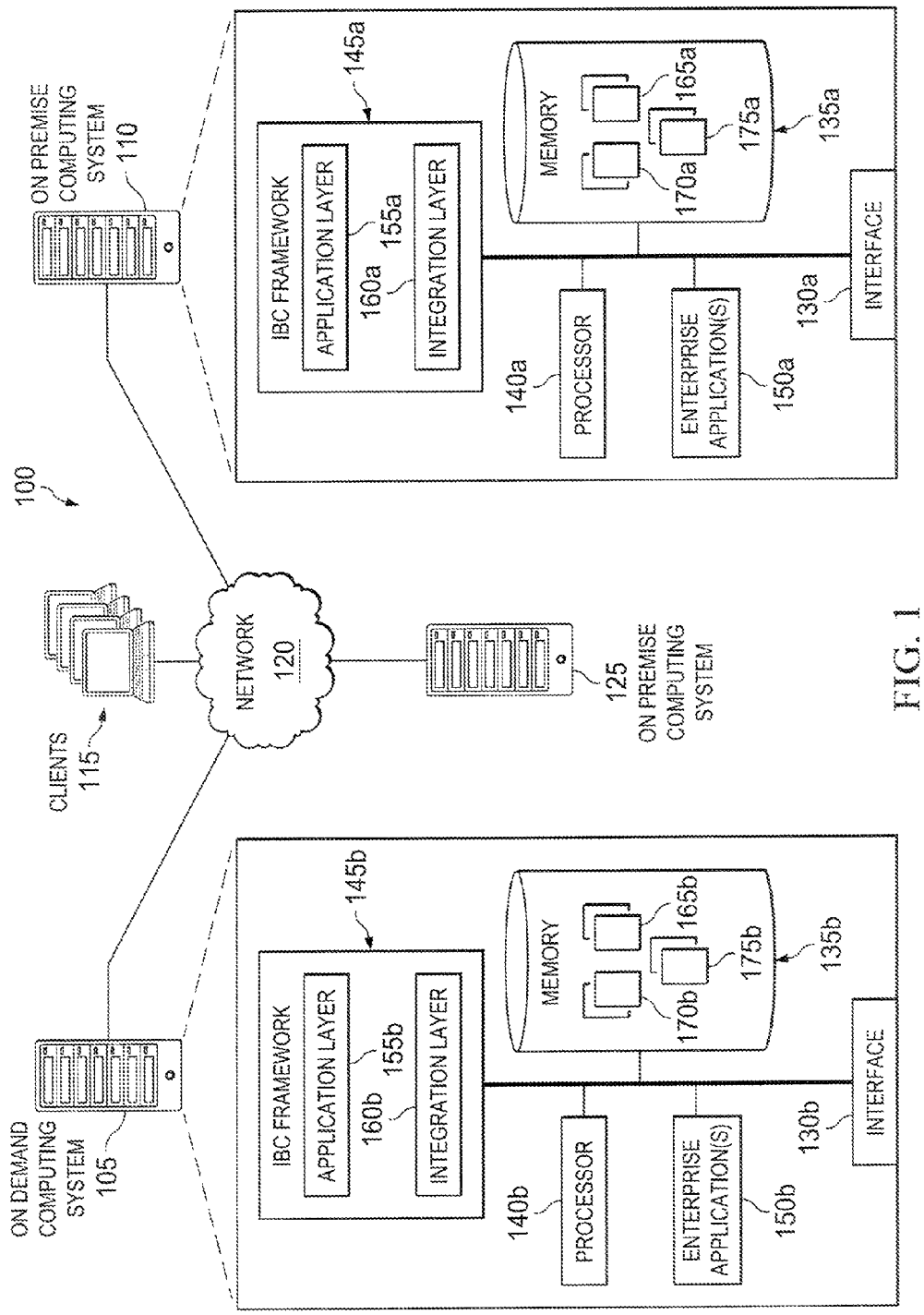
FIG. 1 illustrates an example distributed computing system including an identifiable business context (IBC) framework.

FIG. 1 illustrates an example distributed computing system 100 including an identifiable business context (IBC) framework. As illustrated, the system 100 includes an on-demand computing system 105, two on-premise computing systems 110 and 125, and one or more clients 115 communicably coupled through a network 120. In alternative embodiments, however, one or more of these components may not be part of the distributed computing system 100 without departing from the scope of the present disclosure. For instance, in some embodiments, the on-demand computing system 105 may not be included in the system 100, and logic (e.g., software, middleware, source code, executable instructions, data, and otherwise) illustrated as residing on the on-demand computing system 105 may be located on, for example, the on-premise computing systems 110 or 125, or another computing system communicably coupled through the network 120. In any event, the illustrated system 100 may have alternative embodiments where various components (e.g., servers, databases, software modules, and otherwise) are not present or reside in or on different appliances than shown in FIG. 1. For example, in some embodiments, the IBC framework 145b in the on-premise computing system 110 may be located on the on-demand computing system 105, for example, in a cloud-based computing environment.

Each of the on-demand computing system 105 and on-premise computing systems 110, 125 includes a server appliance having a processor and an interface. For example, the illustrated on-demand computing system 105 includes a processor (or processors) 140a and an interface (or interfaces) 130a. Similarly, the illustrated on-premise computing system 110 includes a processor (or processors) 140b and an interface (or interfaces) 130b. As further illustrated, the on-demand computing system 105 includes an IBC framework 145a including an application layer 155a and an integration layer 160a. At a high level, the application layer 155a may present an interface to one or more users of the on-demand computing system 105 through one or more of the enterprise applications 150a. The integration layer 160a may receive, from the application layer 155a, an IBC describing a business entity used in one or more of the enterprise applications 150a, for storage in a repository communicably coupled to the application. In receiving the IBC from the application layer 155a, the on-demand computing system 105 may associate the IBC with a communication connection involving the business entity described by the IBC. The integration layer 160a may receive a request to modify the IBC describing the business entity, verify the request through the application layer 155a, and modify the IBC based on the verification of the request.

In some embodiments, the integration layer 160a may identify an IBC referenced on another computing system such as the on-premise computing system 110 or 125 through the application layer 155a, describing a business entity located in the other computing system. The on-demand computing system 105 may then identify a communication connection between the business entities in the different computing systems and generate an identifiable business context reference (IBCR) associated with the communication connection for storage on the on-demand computing system 105.

In some embodiments, the on-demand computing system 105 may identify a set of routing rules stored in a database and receive a request for a business transaction through one or more of the enterprise applications 150a. The on-demand computing system 105 may then determine an IBCR associated with a business entity located in another computing system based on the identified routing rules. Based on the identified IBCR, the on-demand computing system 105 may determine a communication connection associated with the IBCR and an IBC associated with the on-demand computing system 105, and initiate the business transaction between the business entity in the on-demand computing system and the business entity in the other computing system.

Similar functions may be provided by the IBC framework 145b in the on-premise computing system 110, which includes an application layer 155b and an integration layer 160b as well. For example, the application layer 155b may present an interface to one or more users of the on-premise computing system 110 through one or more of the enterprise applications 150b. The integration layer 160b may receive, from the application layer 155b, an IBC describing a business entity used in one or more of the enterprise applications 150b, for storage in a repository communicably coupled to the application. In receiving the IBC from the application layer 155b, the on-premise computing system 110 may associate the IBC with a communication connection involving the business entity described by the IBC. For another example, the integration layer 160b may identify an IBC referenced on another computing system such as the on-demand computing system 105 through the application layer 155b, describing a business entity located in the other computing system. The on-premise computing system 110 may then identify a communication connection between the business entities in the different computing systems and generate an identifiable business context reference (IBCR) associated with the communication connection for storage on the on-premise computing system 110. As yet another example, the on-premise computing system 110 may identify a set of routing rules stored in a database and receive a request for a business transaction through one or more of the enterprise applications 150b. The on-premise computing system 110 may then determine an IBCR associated with a business entity located in another computing system based on the identified routing rules. Based on the identified IBCR, the on-premise computing system 110 may determine a communication connection associated with the IBCR and an IBC associated with the on-premise computing system 110, and initiate the business transaction between the business entity in the on-premise computing system and the business entity in the other computing system. More details regarding the operation of the IBC framework 145 (e.g., 145a, 145b) including the application layer 155 (e.g., 155a, 155b) and integration layer 160 (e.g., 160a, 160b) are provided below and in the accompanying figures.

In general, the on-demand computing system 105 and on-premise computing systems 110, 125 may each be one or more servers that store applications, software, middleware, and data, for example, the illustrated IBC frameworks 145 (e.g., 145a, 145b), the illustrated enterprise applications 150 (e.g., 150a, 150b), and any hosted applications located on the on-demand computing system 105. In some instances, the on-demand computing system 105 and on-premise computing systems 110, 125 may each store a plurality of various applications. In some instances, the on-demand computing system 105 and on-premise computing systems 110, 125 may each comprise a web server, where the IBC framework 145 (e.g., 145a, 145b), the applications 150 (e.g., 150a, 150b), and any other applications represent one or more web-based applications accessed and executed via network 120 by the clients 115, or other clients of the system 100 to perform the programmed tasks or operations of the IBC framework 145 (e.g., 145a and 145b).

At a high level, the on-demand computing system 105 and on-premise computing system 110, 125 each represents an electronic computing device operable to receive, transmit, process, store, or manage data and information associated with the system 100. For example, the on-premise computing system 110 may be responsible for receiving application requests from one or more client applications associated with the clients 115 of system 100 (e.g., enterprise clients or other clients) and responding to the received requests by processing said requests with the IBC framework 145b, enterprise applications 150b, and/or other application, and sending the appropriate response back to the requesting clients 115 illustrated in FIG. 1. Requests associated with the IBC framework 145b and/or other applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server associated with the on-demand computing system 105 and a single server associated with the on-premise computing system 110, system 100 can be implemented using two or more servers at each of the on-demand computing system 105 and the on-premise computing system 110, as well as computers other than servers, including a server pool. Indeed, on-demand computing system 105 and on-premise computing systems 110, 125 may each be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated on-demand computing system 105 and on-premise computing system 110, 125 may each be adapted to execute any operating system, including Linux, UNIX, Windows, Mac OS, or any other suitable operating system.

At a high level, the IBC framework 145 (e.g., 145a and 145b) including the application layer 155 and integration layer 160 is any application, program, module, process, or other software that may execute, change, delete, generate, or otherwise manage information according to the present disclosure, particularly in response to and in connection with one or more requests received from the illustrated clients 115 and their associated client applications. In certain cases, system 100 may implement a composite IBC framework 145 (e.g., 145a and 145b). For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the IBC framework 145 (e.g., 145a and 145b) may represent web-based applications accessed and executed by remote clients or client applications via the network 120 (e.g., through the Internet). Further, while illustrated as internal to the on-demand computing system 105 and on-premise computing system 110, one or more processes associated with the IBC framework 145 (e.g., 145a and 145b) may be stored, referenced, or executed remotely. For example, a portion of the IBC framework 145 (e.g., 145a and 145b) may be a web service associated with the application that is remotely called, while another portion of the IBC framework 145 (e.g., 145a and 145b) may be an interface object or agent bundled for processing at a remote client. Moreover, any or all of the IBC framework 145 (e.g., 145a and 145b) may be a child or sub-module of another software module or enterprise application (not illustrated) without departing from the scope of this disclosure. Still further, portions of the IBC framework 145 (e.g., 145a and 145b) may be executed by a user working directly at the on-demand computing system 105, on-premise computing system 110, as well as remotely.

The illustrated interface 130 (e.g., 130a, 130b) may be used by the on-demand computing system 105 and on-premise computing system 110, respectively, for communicating with other systems in a client-server or other distributed environment (including within system 100) connected to the network 120 (e.g., clients 115, other on-premise computing system 125, as well as other systems communicably coupled to the network 120). Generally, the interface 130 (e.g., 130a and 130b) includes logic encoded in software and/or hardware in a suitable combination and operable to communicate with the network 120. More specifically, the interface 130 (e.g., 130a and 130b) may comprise software supporting one or more communication protocols associated with communications such that the network 120 or interface's hardware is operable to communicate physical signals within and outside of the illustrated system 100.

As illustrated in FIG. 1, the on-demand computing system 105 and the on-premise computing system 110 each includes a processor 140 (e.g., 140a, 140b). Although illustrated as a single processor 140 (e.g., 140a and 140b) in FIG. 1, two or more processors may be used according to particular needs, desires, or particular embodiments of system 100. Each processor 140 (e.g., 140a and 140b) may be a central processing unit (CPU), a blade, an application specific integrated circuit (ASIC), a field-programmable gate array (FPGA), or another suitable component. Generally, the processor 140 (e.g., 140a and 140b) executes instructions and manipulates data to perform the operations of the respective on-demand computing system 105 or on-premise computing system 110 and, specifically, the IBC framework 145 (e.g., 145a and 145b), applications 150 (e.g., 150a and 150b), and other applications. Specifically, the processor 140 (e.g., 140a and 140b) executes the functionality required to receive and respond to requests from the clients 115 and their respective client applications, as well as the functionality required to perform the other operations of the IBC framework 145 (e.g., 145a and 145b).

Regardless of the particular implementation, "software" may include computer-readable instructions, firmware, wired or programmed hardware, or any combination thereof on a tangible, non-transitory (or in some instance transitory) medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 100, processor 140 (e.g., 140a and 140b) executes the respective portion (all are a part) of the applications on the on-demand computing system 105 or applications on the on-premise system 110.

Generally, the network 120 facilitates wireless or wireline communications between the components of the system 100 (e.g., between the on-demand computing system 105 and on-premise computing systems 110, 125 and the clients 120), as well as with any other local or remote computer, such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the clients 120 and the on-demand computing system 105 and the on-premise computing systems 110, 125. Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated system 100.

The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated, each of the on-demand computing system 105 and on-premise computing system 110 includes a memory 135 (e.g., 135a, 135b). Memory 135 may include any memory or database module and may take the form of volatile or non-volatile memory including, without limitation, magnetic media, optical media, random access memory (RAM), read-only memory (ROM), removable media, or any other suitable local or remote memory component. Memory 135 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the on-demand computing system 105, on-premise computing systems 110, 125, and their one or more enterprise applications 150 (e.g., 150a and 150b). Additionally, memory 135 (e.g., 135a and 135b) may include any other appropriate data, such as VPN applications, firmware logs and policies, firewall policies, a security or access log, print or other reporting files, as well as others.

In some embodiments, the memory 135 (e.g., 135a and 135b) may store and/or reference one or more business routing rules 165 (e.g., 165a and 165b), IBCs and/or IBCRs 170 (e.g., 170a and 170b), and a registry 175 (e.g., 175a and 175b) that stores information associated with the IBCs and/or IBCRs 170 (e.g., 170a and 170b) in the on-demand computing system 105 or on-premise computing system 110, respectively. Additionally, the memory 135 (e.g., 135a and 135b) may store or reference one or more scripts that include, for example, a payload of the one or more business transaction messages associated with a set of routing rules. In addition, in some embodiments, the memory 135 (e.g., 135a and 135b) may store or reference one or more database tables that include descriptions of one or more business entities being involved in the communication connections on one or more nodes of the on-demand computing system 105 or on-premise computing system 110.

Each of the illustrated clients 115 may be any computing device operable to connect to or communicate with at least the on-demand computing system 105 and on-premise computing systems 110, 125 and/or via the network 120 using a wireline or wireless connection. Further, each illustrated client typically includes a processor, an interface, a graphical user interface (GUI), a client application, and a memory. In general, each illustrated client comprises an electronic computer device operable to receive, transmit, process, and store any appropriate data associated with the system 100 of FIG. 1.

There may be any number of clients associated with, or external to, system 100. For example, while illustrated system 100 includes clients 115, alternative implementations of system 100 may include a single client communicably coupled to the on-demand computing system 105 or on-premise computing system 110, or any other number suitable to the purposes of the system 100. Additionally, there may also be one or more additional clients external to the illustrated portion of system 100 that are capable of interacting with the system 100 via the network 120. Further, the term "client" and "user" may be used interchangeably as appropriate without departing from the scope of this disclosure. Moreover, while each client is described in terms of being used by a single user, this disclosure contemplates that many users may use one computer, or that one user may use multiple computers.

As used in this disclosure, "client" is intended to encompass a personal computer, touch screen terminal, workstation, network computer, kiosk, wireless data port, smart phone, personal data assistant (PDA), one or more processors within these or other devices, or any other suitable processing device. For example, each client may comprise a computer that includes an input device, such as a keypad, touch screen, mouse, or other device that can accept user information, and an output device that conveys information associated with the operation of the on-demand computing system 105 and the on-premise computing system 110 (and IBC framework 145b) or the client itself, including digital data, visual information, the client application, or the GUI.

Both the input and output device may include fixed or removable storage media such as a magnetic storage media, CD-ROM, or other suitable media to both receive input from and provide output to users of the clients through the display, namely, the GUI.

A GUI typically comprises a graphical user interface operable to interface with at least a portion of system 100 for any suitable purpose, including generating a visual representation of client application (in some instances, the client's web browser) and the interactions with the IBC framework 145 (e.g., 145a and 145b), including the responses received from the IBC framework 145 (e.g., 145a and 145b) received in response to the requests sent by a client application. Generally, through the GUI, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI can represent any graphical user interface, including but not limited to, a web browser, touch screen, or command line interface (CLI) that processes information in system 100 and efficiently presents the information results to the user.

In general, a GUI may include a plurality of user interface (UI) elements, some or all associated with a client application, such as interactive fields, pull-down lists, and buttons operable by the user at a particular client. These and other UI elements may be related to or represent the functions of the client application, as well as other software applications executable from a particular illustrated client. For purposes of the present location, a GUI may be a part of or the entirety of a client application, while also merely a tool for displaying the visual representation of application actions and interactions.

Figure 2:
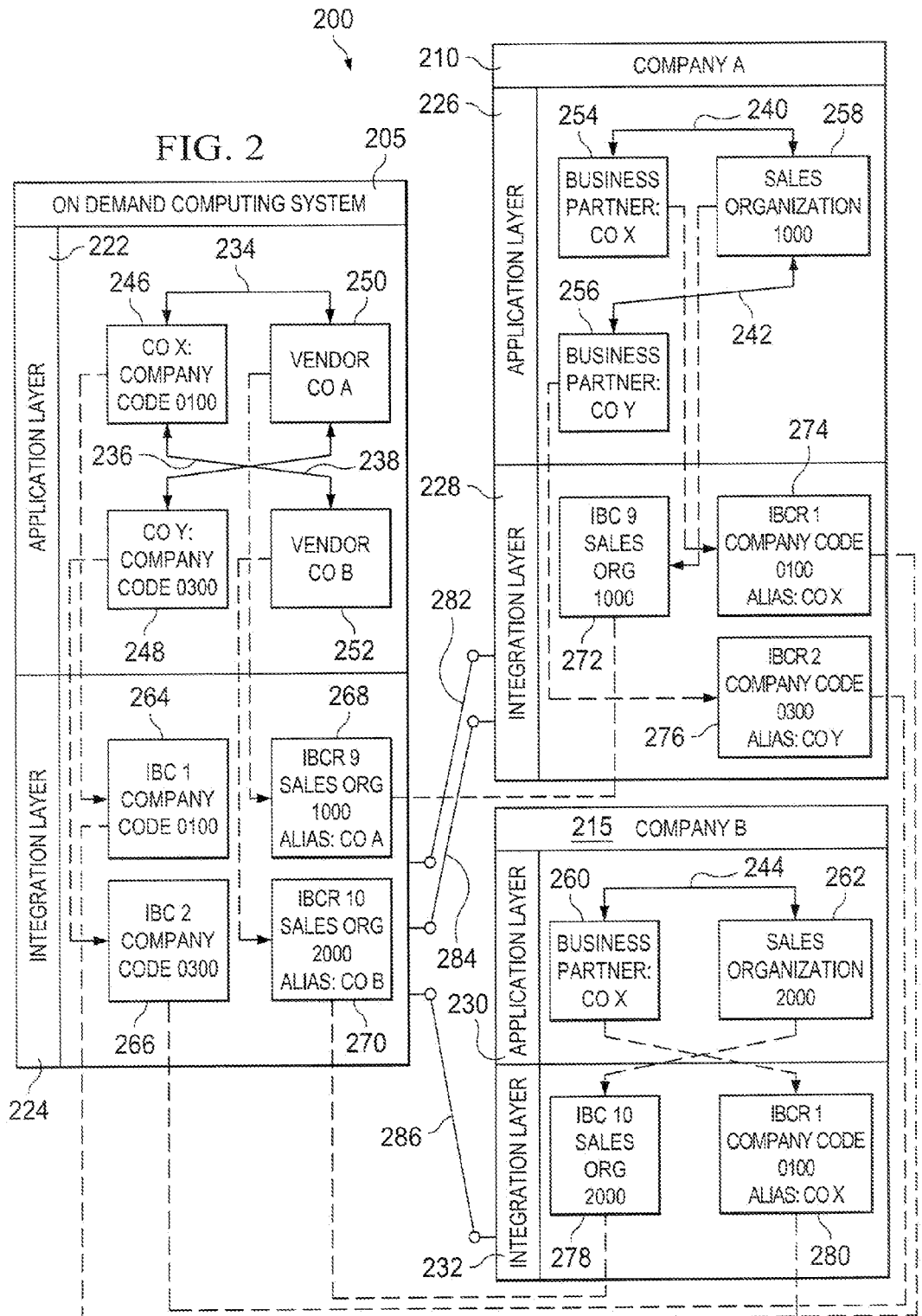
FIG. 2 illustrates an example architecture of an IBC framework used in a distributed computing environment.
Figure 4D:
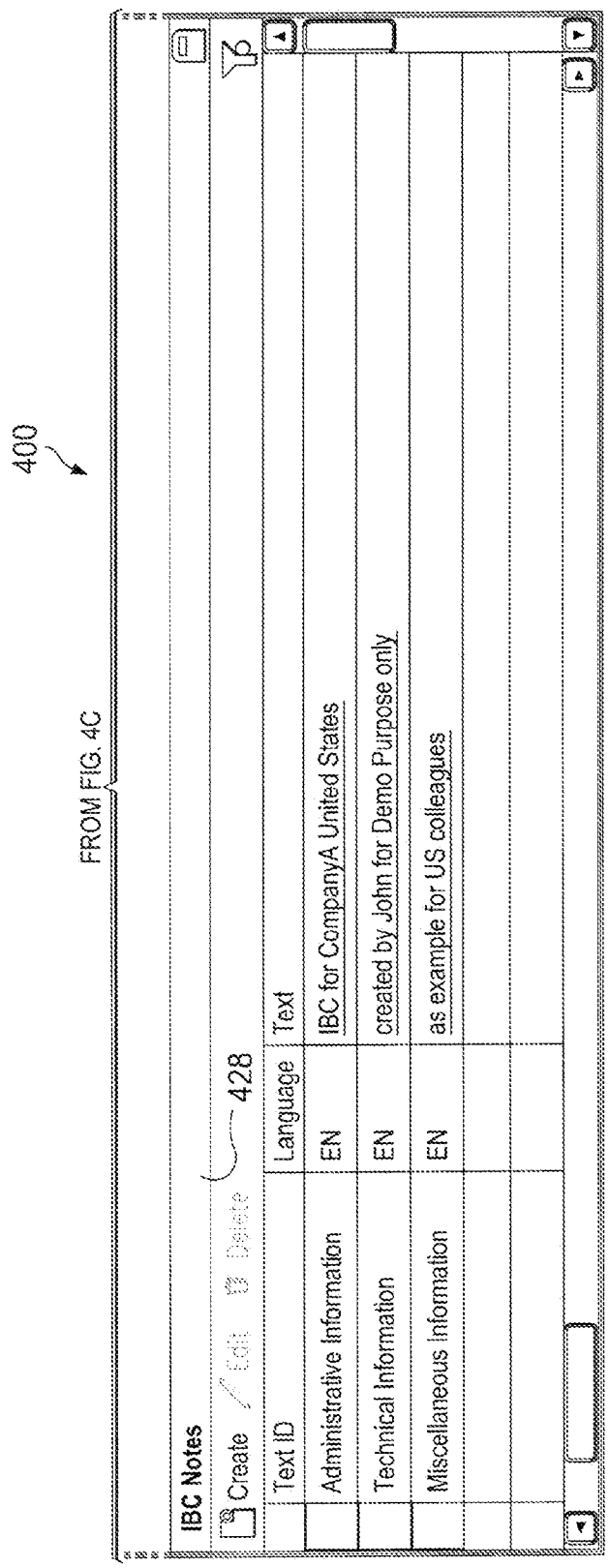

FIG. 2 illustrates an example architecture 200 of an IBC framework usage in distributed computing systems. In some embodiments, the illustrated architecture may be implemented in a distributed computing system, such as, for example, the distributed computing system 100 shown in FIG. 1. Alternatively, the illustrated architecture may be implemented in other distributed computing systems other than that illustrated in FIG. 1.

The illustrated example architecture 200 includes an on-demand computing system 205, an on-premise computing system 210 for company A, and another on-premise computing system 215 for company B. In the illustrated embodiment, each of the computing systems also includes an application layer (e.g., 222, 226, 230) and an integration layer (e.g., 224, 228, 232). For example, in some embodiments, each application and integration layer is part of an IBC framework, as described in reference to FIG. 1 above. But in alternative embodiments, the application layer and integration layer of the on-premise computing systems 210 and 215 may be located in a remote cloud-based computing system that can be accessed by the on-premise computing systems through internet.

The illustrated on-demand computing system 205 hosts applications for companies X and Y, which have business relationships with companies A and B. Companies X and Y may need to establish communication connections with companies A and B to exchange information with them. Likewise, Companies A and B hosted in the on-premise computing systems 210 and 215 may need to establish communication connections with companies X and Y for the purpose of exchanging information. In particular, as illustrated in FIG. 2, company X has business relationships 234 and 236 with vendor companies A and B, respectively. Company Y has a business relationship 238 with vendor company A. From the perspective of the on-premise computing systems, sales organization of company A has business relationships 240 and 242 with business partners X and Y, respectively. Sales organization of company B has a business relationship 244 with business partner X.

As illustrated in FIG. 2, the business relationships, as well as the business entities 246-262 associated with the business relationships, may be identified in the application layer of the distributed computing systems. In order to address the business entities in communicably-coupled computing systems, IBC and IBCR objects may be generated in the integration layer describing the identified business entities and be used to define communication connections between the business entities. In some embodiments, the integration layer may also obtain the IBC objects of other computing systems by looking up them in a public service registry that publishes all the IBC information in the related businesses. As a result, communication connections may be established between the IBC and IBCR objects in the integration layers.

The illustrated business entities 246-262 in the application layer may be mapped to IBC or IBCR objects in the integration layer. The business entities in the application layer are connected with the corresponding IBC or IBCR objects in the integration layer using dashed lines, pointing to the IBC or IBCR objects. For example, company X 246 with company code 0100 in the application layer 222 can be represented in the integration layer 224 as a first IBC object 264. The company code may be included in the IBC object for describing the associated business entity. Similarly, company Y 248 with company code 0300 in the application layer 222 can be represented in the integration layer 224 as a second IBC object 266. Since vendor company A 250 identified in the application layer 222 is a business entity located in another computing system 210, the on-demand computing system 205 may generate an IBCR object 268 describing the remote business entity in the local system. As such, communications directed to the remote business entity can be addressed in the local computing system using the IBCR. Vendor company B 252 in the application layer 222 can be mapped to a corresponding IBCR object 270 in the integration layer 224 in a similar manner. Thus, business entities in both local and remote computing systems may be created and stored as IBC or IBCR objects in the integration layer. In addition, the on-demand computing system 205 may publish the local IBC objects describing business entities in the local system to a registry that is exposed to a variety of applications, such that the IBC objects describing the local business entities may be accessed by other remote computing systems.

As illustrated in FIG. 2, the IBC objects in the on-demand computing system 264, 266, describing local business entities, may be referenced at a remote computing system such as the on-premise computing systems 210 and 215, as an IBCR object. For example, IBC object 264 is referenced as corresponding IBCR object 274 in the on-premise computing system 210 for company A, and IBCR object 280 in the on-premise computing system 215 for company B. The IBC object in the local system is connected with the corresponding IBCR object in the remote system using dashed lines. It can also be seen that the IBC object 266 describing local business entity company Y is referenced as IBCR object 276 in the on-premise computing system 210 for company A. Thus, for each IBC object describing a local business entity, one or more corresponding IBCR objects may exist in remote computing systems describing the same business entity.

The on-premise computing system 210 for company A and computing system 215 for company B may create and store their own IBC and IBCR objects, in a similar manner as the described on-demand computing system 205. For example, IBC object 272 may be created in the integration layer 228 of the computing system 210, describing the local business entity, e.g., sales organization 258. Remote business entities (e.g., business partners 254, 256) identified in the application layer 226 may be created as IBCR objects 274, 276 in the integration layer 228. Further, the IBC object 272 describing the local business entity in the computing system 210 may be referenced as an IBCR object 268 in the on-demand computing system 205. Likewise, IBC object 278 may be created in the integration layer 232 of the computing system 215, describing the local business entity, e.g., sales organization 262. Remote business entities (e.g., business partner 260) identified in the application layer 230 may be created as IBCR object 280 in the integration layer 232. Further, the IBC object 278 describing the local business entity in the computing system 215 may be referenced as an IBCR object 270 in the on-demand computing system 205. The on-premise computing systems 210, 215, may also publish the IBC objects created in the integration layer, describing the local business entities, to a registry such that the IBC objects may be accessed and used by other computing systems.

With the IBC and IBCR objects created in the integration layer, it is possible to establish communication connections addressing the business entities in the different computing systems. For example, a communication connection 282 between IBC object 264 in the on-demand computing system 205 and IBC object 272 in the on-premise computing system 210 for company A may be set up using the IBC and IBCR objects, resulting from the business relationship 234 between company X 246 and vendor company A 250 in the application layer 222 of the on-demand computing system 205, as well as the business relationship 240 between sales organization 258 and business partner 254 in the application layer 226 of the on-premise computing system 210. Further, the logical port of the connection 282 may be created using the IBC and IBCR information at the computing system initiating the connection.

Similarly, a communication connection 284 between IBC object 266 in the on-demand computing system 205 and IBC object 272 in the on-premise computing system 210 for company A may be established, resulting from the business relationship 238 between company X 248 and vendor company A 250 in the application layer 222 of the on-demand computing system 205, as well as the business relationship 242 between sales organization 258 and business partner 256 in the application layer 226 of the on-premise computing system 210.

The on-premise computing system for company B 215 may also establish a communication connection 286 with the on-demand system 205, defining the connection between IBC object 278 in the computing system 215 and IBC object 264 in the computing system 205, as a result of the business relationship 236 between company X 246 and vendor company B 252 in the application layer 222 of the on-demand computing system 205, as well as the business relationship 244 between sales organization 262 and business partner 260 in the application layer 230 of the on-premise computing system 215.

The communication connection may be initiated by either of the on-demand or on-premise computing systems, based on the IBC or IBCR information that is used in a common way for all the applications running on the integration layer. Utilizing the IBC framework, business entities in the remote computing systems are now visible in the local computing system and can be addressed regardless of the systems at which the remote business entities are actually located.

FIGS. 3A-3C illustrate an example IBC object 300 presented to a user interface, which describes a business entity as a company. The IBC object 300 includes a globally unique identifier (ID) 302, that may be generated by the integration layer of the local computing system (illustrated in FIG. 2). For a user to retrieve information of a specific IBC object, the user can use the unique ID to look up the IBC object in the local computing system or in the service registry which publishes the IBC information for all related business entities. The ID 302 may be a string of numbers, letters, symbols, or a combination of them. The ID 302 uniquely identifies the IBC object and the associated business entity in the global system including all local and remote distributed computing systems.

The illustrated example IBC object 300 may include various business data attributes associated with the business entity. For example, the IBC object 300 also includes a description field 304 providing a short description of the IBC object. The description field may include name of the business entity, location of the business entity, and/or a code associated with the business entity in the computing system. The IBC object may also include a field 306 for receiver type describing the type of the receiver associated with the IBC object, and a field 308 for receiver name. Further, the IBC object may include a field 310 for the class name, specifying the class of the IBC object. The duration that the IBC object is valid for may also be included in the IBC object, illustrated in 312 and 314.

The information of ID, description, receiver type, receive name, class name and validity associated with the IBC object may be presented as portion of the general data section in the IBC object presented to the user interface. Other information such as application component may be included in the general data section as well. In some embodiments, the presented general data associated with the IBC object may be generated by the computing system and may not be editable by the user.

Furthermore, the illustrated example IBC object may include descriptions 316 for describing the business entity associated with the IBC object in more details. The descriptions 316 may be described in multiple different languages to provide descriptions for users in different countries. The illustrated IBC object also includes business contact details 318 of the business entity associated with the IBC object, e.g., name, telephone numbers and mail addresses. Technical contact details 320 of the IBC object may also be provided for technical maintenance and update with the particular IBC object. In some embodiments, the description 316, business contact details 318, and technical contact details 320 may be modified or updated by the user through the user interface.

Additionally, the illustrated example IBC object includes administrative data such as IBC uniform resource locators (URLs) 322 and notes 324 for the IBC object. Specifically, the IBC URLs 322 may include an internet address where an extensible markup language (XML) file for the presented business data attributes associated with the IBC object can be found. One or more URLs may be provided in the IBC URLs, although they point to the same XML file. An example XML file associated with the illustrated IBC object 300 is presented below in Table 1. Moreover, additional details related to the IBC object and the associated business entity such as additional administrative information, additional technical information, may be included in a notes section 324 of the presented IBC object. These additional details may be input by a user through the user interface.

TABLE 1 an XML file for illustrated IBC object 300

```
<IBCxmlns:prx="urn:comx.com:proxy:BLD:/1SAI/
TAEDD8C582F85C7C1B7DA43:804">
<Id>005056A5037A1EE195FA63825D0607AB</Id>
<ReceiverType>BUKRS</ReceiverType>
<ReceiverName>0100</ReceiverName>
<ValidFrom>2012-01-01T00:00:00Z</ValidFrom>
<ValidTo>9999-12-31T23:59:59Z</ValidTo>
<LastChange>2012-02-15T12:49:45Z</LastChange>
<ApplicationComponentID/>
<ReceiverSystem>bld-cust100.wdf.comx.corp</ReceiverSystem>
<Descriptions>
<Description>
<Language>DE</Language>
<Text>Buchungskreis 0100 - ComY US</Text>
</Description>
<Description>
<Language>EN</Language>
<Text>Company Code 0100 - ComY US</Text>
</Description>
</Descriptions>
<TechnicalContact>
<FirstName>Marco</FirstName>
<LastName>Roddick</LastName>
<PhoneNumbers>
<PhoneNumber>
<Default>true</Default>
<Number>001-888-706-0585</Number>
</PhoneNumber>
</PhoneNumbers>
<EMailAdresses>
<EMailAdress>
<Default>true</Default>
<Adress>marco@comy.us</Adress>
</EMailAdress>
</EMailAdresses>
</TechnicalContact>
<BusinessContact>
<FirstName>Harold</FirstName>
<LastName>Marks</LastName>
<PhoneNumbers>
<PhoneNumber>
<Default>true</Default>
<Number>001-555-706-0584</Number>
</PhoneNumber>
</PhoneNumbers>
<EMailAdresses>
<EMailAdress>
<Default>true</Default>
<Adress>marks@comy.com</Adress>
</EMailAdress>
</EMailAdresses>
</BusinessContact>
<IBCNotes>
<Note>
<Id>0001</Id>
<Language>EN</Language>
<Text>IBC for ComY United States</Text>
</Note>
<Note>
<Id>0002</Id>
<Language>EN</Language>
<Text>created by Marco for Demo Purpose only</Text>
</Note>
<Note>
<Id>0099</Id>
<Language>EN</Language>
<Text>as example for US colleagues</Text>
</Note>
</IBCNotes>
<ReceiverTypeLongtexts>
<ReceiverTypeLongtext>
<Language>EN</Language>
<Description>Company Code</Description>
</ReceiverTypeLongtext>
<ReceiverTypeLongtext>
<Language>DE</Language>
```

TABLE 1-continued an XML file for illustrated IBC object 300

```
<Description>Buchungskreis</Description>
</ReceiverTypeLongtext>
</ReceiverTypeLongtexts>
</IBC>
```

The illustrated IBC object 300 is merely for illustration purpose and should not be limiting on the construction of IBC objects. Other business data attributes related to the associated business entity may be included in the IBC object. The IBC object is flexible enough to store any kind of business entity and carry any type of helpful information describing the business entity to the user of the business application.

FIGS. 4A-4D illustrate an example identifiable business context reference (IBCR) object 400 presented to a user interface, which describes the same business entity as in FIGS. 3A-3C. Like the IBC object 300, the IBCR object 400 includes a globally unique identifier (ID) 402, which contains the same content as the ID of the corresponding IBC object 300 (illustrated in FIGS. 3A-3C). The ID 402 of the IBCR object may be copied from the corresponding IBC object describing the same business entity. For a user to retrieve information of a specific IBC object describing a business entity in a remote computing system, the user can use the unique ID to look up the IBCR object in the local computing system or in the service registry which publishes the IBC information for all related business entities. The ID 402 may be a string of numbers, letters, symbols, or a combination of them. The ID 402 uniquely identifies the IBCR object and the associated business entity in the global system including all local and remote distributed computing systems. In each remote computing system, there may exist an IBCR object describing the business entity located outside of the remote computing system. Even though different IBCR objects may be used in different remote computing systems to describe the same business entity, the ID field of the IBCR objects would be the same.

The illustrated example IBCR object 400 may include various business data attributes associated with the business entity located in a remote computing system. For example, the IBCR object 400 also includes a description field 404 providing a short description of the business entity associated with the IBCR object. The description field may include name of the business entity, location of the business entity, and/or a code associated with the business entity in the computing system. The IBCR object may also include a field 406 for receiver type describing the type of the receiver associated with the IBCR object, and a field 408 for receiver name. Further, the IBCR object may include a field 410 for the receiver system, specifying the remote system where the business entity associated with the IBCR object is located at. The duration that the IBCR object is valid for may also be included in the IBCR object, illustrated in 412 and 414. The information of ID, description, receiver type, receive name, class name and validity associated with the IBC object may be presented as portion of the general data section in the IBCR object presented to the user interface.

Other information such as application component may be included in the general data section as well. The contents of the general data section in the IBCR object, except the field of receiver system 410, may be substantially identical to the contents in the corresponding IBC object of the computing system where the associated business entity resides. In some embodiments, the presented general data associated with the IBCR object may be copied from the corresponding IBC object describing the same business entity.

The illustrated IBCR object 400 further includes a usage section 416, describing the usage of the IBCR object in the local computing system. For example, the usage section 416 may include the receiver type, receiver name, class name, application component, describing how the IBCR object is used in the local computing system. Additionally, an assignment section 418 may be included in the IBCR object, assigning the system for the business entity associated with the IBCR object, such that a physical connection may be established with the business entity located in another computing system.

Furthermore, the illustrated example IBCR object may include descriptions 420 for describing the business entity associated with the IBCR object in more details. The descriptions 420 may be described in multiple different languages to provide descriptions for users in different countries. The illustrated IBCR object also includes business contact details 422 of the business entity associated with the IBCR object, e.g., name, telephone numbers and mail addresses. Technical contact details 424 of the IBC object may also be provided for technical maintenance and update with the particular IBC object. In some embodiments, the description 420, business contact details 422, and technical contact details 424 of the IBCR object may be copied from the contents of the corresponding IBC object describing the same business entity.

Additionally, the illustrated example IBCR object includes administrative data such as the IBCR notes 426 and the IBC notes 428. IBCR notes 426 may include additional administrative information regarding the IBCR object. The IBCR notes 426 may be input by a user through the user interface. Additional details related to the corresponding IBC object and the associated business entity, such as additional administrative information, additional technical information, may be included in a notes section 428 of the presented IBCR object. In some embodiments, the IBC notes 428 may be copied from the contents of the corresponding IBC object associated with the same business entity.

The illustrated example IBCR object 400 may be generated from an XML file, defining the unique ID and the business data attributes associated with the business entity. In some embodiments, some portion of the XML file may be copied from the original XML file defining the corresponding IBC object. An example XML file associated with the illustrated IBCR object 400 is presented below in Table 2.

TABLE 2 an XML file for illustrated IBCR object 400

<IBCRxmlns:prx="urn:comx.com:proxy:BLD:/1SAI/
TAE46E78D428E7D1729A069:804">
<Id>005056A5037A1EE195FA63825D0607AB</Id>
<ReceiverType>BUKRS</ReceiverType>
<ReceiverName>0100</ReceiverName>
<ReceiverSystem>bld-cust100.wdf.comx.corp</ReceiverSystem>
<LastChange>2012-02-15T12:59:57Z</LastChange>
<ValidFrom>2012-01-01T00:00:00Z</ValidFrom>
<ValidTo>9999-12-31T23:59:59Z</ValidTo>
<ApplicationComponentID/>
<Descriptions>
<Description>
<Language>DE</Language>
<Text>Buchungskreis 0100 - ComY US</Text>
</Description>
<Description>
<Language>EN</Language>
<Text>Company Code 0100 - ComY US</Text>
</Description>

TABLE 2-continued an XML file for illustrated IBCR object 400

</Descriptions>
<Usages>
<Usage>
<AliasReceiverName>AMAZON_AMERICAS</AliasReceiverName>
<AliasReceiverType>BUPA</AliasReceiverType>
<ClassName>ZCL_FC_IBCR_APPL1</ClassName>
<ApplicationComponentID/>
</Usage>
</Usages>
<Assignment>
<ProviderSystem>
<ProviderSystemId>005056B446721EE0B7C117020CF0C81F
</ProviderSystemId>
<Type>TMPL</Type>
<Name>bld-cust100.wdf.comx.corp</Name>
<Description>Automatically created for Domain System 'bld-cust100.wdf.comx.corp'</Description>
<ProfileName>PROFILE</ProfileName>
<ProfileVersion>0 </ProfileVersion>
<BusinessApplications>
<BusinessApplication>
<Name>comx.com/BusinessApplicationABAP</Name>
<Description>Hein Blod</Description>
<BusinessAppId>0050568E45DF1DEFA189AA86172A0FD6
</BusinessAppId>
</BusinessApplication>
</BusinessApplications>
</ProviderSystem>
</Assignment>
<TechnicalContact>
<FirstName>Marco</FirstName>
<LastName>Roddick</LastName>
<PhoneNumbers>
<PhoneNumber>
<Default>true</Default>
<Number>001-555-706-0585</Number>
</PhoneNumber>
</PhoneNumbers>
<EMailAdresses>
<EMailAdress>
<Default>true</Default>
<Adress>marco@comy.us</Adress>
</EMailAdress>
</EMailAdresses>
</TechnicalContact>
<BusinessContact>
<FirstName>Harold</FirstName>
<LastName>Marks</LastName>
<PhoneNumbers>
<PhoneNumber>
<Default>true</Default>
<Number>001-555-706-0584</Number>
</PhoneNumber>
</PhoneNumbers>
<EMailAdresses>
<EMailAdress>
<Default>true</Default>
<Adress>marks@comy.com</Adress>
</EMailAdress>
</EMailAdresses>
</BusinessContact>
<IBCNotes>
<Note><Id>0001</Id>
<Language>EN</Language>
<Text>IBC for ComY United States</Text>
</Note>
<Note>
<Id>0002</Id>
<Language>EN</Language>
<Text>created by Marco for Demo Purpose only</Text>
</Note>
<Note>
<Id>0099</Id>
<Language>EN</Language>
<Text>as example for US colleagues</Text>
</Note>
</IBCNotes>
<IBCRNotes>

TABLE 2-continued an XML file for illustrated IBCR object 400

```
<Note>
<Id>0001</Id>
<Language>EN</Language>
<Text>IBC Reference for Business Partner ComY Americas
(which points to IBC of Company Code 0100 which is ComY US)</Text>
</Note>
</IBCRNotes>
<ReceiverTypeLongtexts>
<ReceiverTypeLongtext>
<Language>DE</Language>
<Description>Buchungskreis</Description>
</ReceiverTypeLongtext>
<ReceiverTypeLongtext>
<Language>EN</Language>
<Description>Company Code</Description>
</ReceiverTypeLongtext>
</ReceiverTypeLongtexts>
</IBCR>
```

Figure 5:
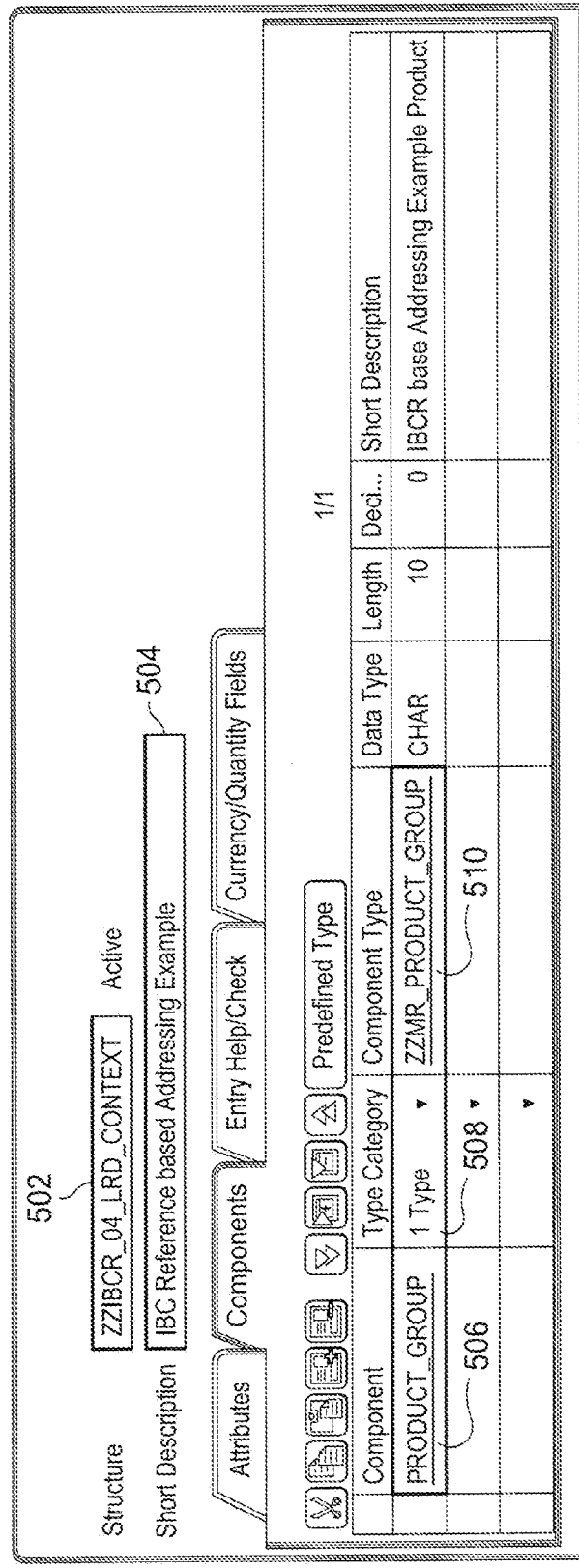
FIG. 5 illustrates an example business context definition for configuring routing rules.

FIG. 5 illustrates an example business context definition 500 for configuring routing rules. The illustrated business context definition 500 defines a product group component as a component for routing rules. The product group may be office supplies, books, hardware, software, or any other type of product related to the business. The business context definition may be developed during a development phase, e.g., prior to the configuration phase when the user configures the routing rules for a logical receiver determination.

As illustrated in FIG. 5, the business context definition includes a structure 502 associated with the defined component, and a short description 504 describing the usage or purpose of the business context definition. In the specification of components, the component name 504, type category 508, and component type 510 are included to describe the product group component, which is used for the users to configure the routing rules. Other descriptions with respect to the product group component may also be included, such as data type, length, short description, etc.

Although FIG. 5 only illustrates the business context definition of a product group, other types of business context, such as company location, business revenue, years of business relationship, can be defined in a similar manner for the purpose of configuring routing rules. After the business context for a group of routing components are defined, the user may select one or more components in the defined business context and configure appropriate values to determine a desired logical receiver.

Figure 6:
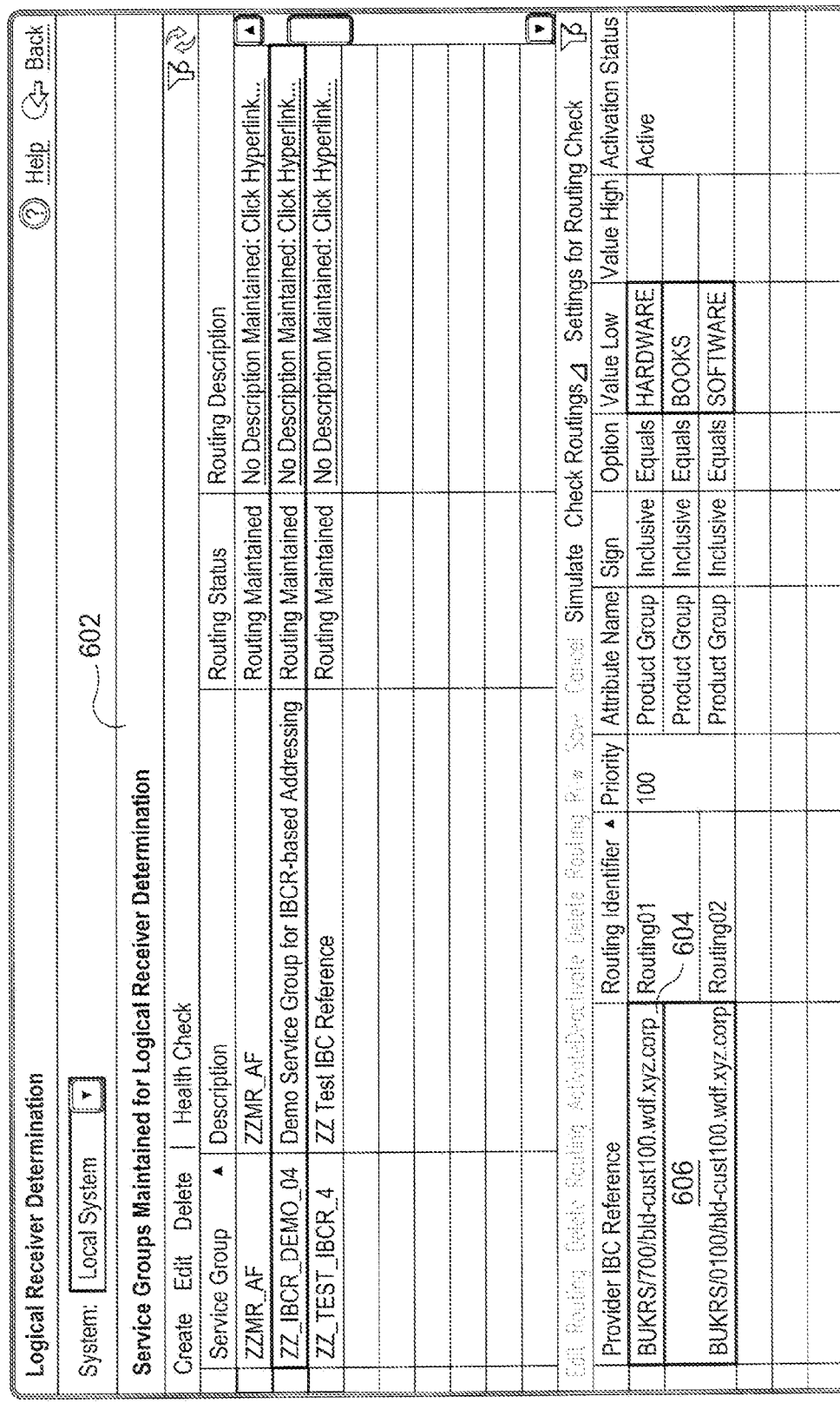
FIG. 6 illustrates an example of routing rule maintenance using an IBC framework.

FIG. 6 illustrates an example of routing rule maintenance 600 using an IBC framework. The routing rules are configured by a user of a client application to determine a logical receiver of a call or communication connection. Without the IBC framework, logical receiver determination may provide information about provider systems that enables a client application to decide which provider system to send a call to. In collaborative business processes, calls are often distributed between consumer applications on different systems in a system landscape. For example, a sales order may need to be sent to one or more production sites before it can be completed.

In some embodiments, a logical receiver determination can provide business information about services. For example, legal requirements specific to a country. Having the IBC and IBCR objects describing business entities inside and outside of the local system, logical receiver determination can be enhanced using the IBC framework. With IBCR objects describing business entities located in provider systems (e.g., remote computing systems), the business entities in provider systems can be directly addressed based on the routing rules, no longer the technical provider systems. In other words, the logical receiver determination uses routing rules to decide which business entity to send a call to.

As illustrated in FIG. 6, service groups 602 are maintained for logical receiver determination. The service groups 602 include service interfaces for services associated with the client application. The service groups represent the provide systems from a consumer (e.g., a client) point of view. The logical receiver determination may use the service groups to decide what consumer proxies are needed to communicate with a provider system. A service group for the IBCR-based addressing or IBCR objects may be included to allow the logical receiver determination based on the IBC framework. The service groups 602 may include one or more service groups and may be edited by a user of the logical receiver determination. For each service group, a description, routing status, and routing description may be provided for more information about the service group.

As a result of the logical receiver determination, a list of business entities in compliance with the routing rules are determined and displayed to the user. The IBC objects in the provider system 604 and 606 are returned to describe the business entities in providing systems in compliance of the routing rules configured by the user. The provider IBC reference 604 and 606 point to business entities in the provide systems that satisfy the routing rules. Certain business data attributes associated with the business entities may also be displayed to the user. For example, product groups for each IBC reference may be included in association with the IBC reference. It can be seen from FIG. 6 that a product group of hardware is associated with provider IBC reference 604 and product groups of books and software are associated with provider IBC reference 606. As such, the business entity with IBC reference 604 is the provider of the hardware purchases and the business entity with IBC reference 606 is the provider of books and software purchases, according to the logical receiver determination.

Based on the routing rules configured by the user, different provider IBC references may be returned, presenting different business entities that satisfy the routing rules. Communication connections with the business entities in the provider systems associated with the IBC references may be subsequently established for business transactions or information exchange. Therefore, using the IBC framework, business entities in remote computing systems can be found and addressed in a direct manner, without having to inquire the remote computing system for the business entities first in order to initiate a communication connection.

FIG. 7 illustrates an example method 700 implemented with an IBC for information exchange between business entities. Method 700 may begin at step 702, when an interface is presented to a user for an IBC through an application. The application may be defined in an application layer of a distributed computing system. In some embodiments, the interface may include an application programming interface (API) to/from the application. The IBC may include a globally unique identifier associated with a business entity hosted by the local computing system and a variety of business data attributes associated with the business entity, such as name, type, business contacts, descriptions. The business data attributes may include a unique combination of name and type associated with the business entity. The unique combination of name and type for business entity associated with the IBC may be defined by the application.

In step 704, the IBC may be received from the application for storage in a repository communicably coupled to the application. In some embodiments, the IBC may be received from the application layer to an integration layer communicably coupled to the application layer. Further, the name and type of the business entity associated with the IBC may be received from the application layer. In some embodiments, the integration layer may assign the globally unique identifier to the IBC. The unique identifier may contain a string of numbers, letters, symbols, or a combination of them. The unique identifier and the variety of business data attributes associated with the business entity may be defined in an XML data object. In some embodiments, the IBC includes one or more URLs that point to an internet address where the XML data object can be found.

In step 706, a communication connection may be defined between business entities located at different computing systems. For example, a communication connection may be defined between a sales department of a company and its business partner. The communication connection may be defined by an on-demand computing system, an on-premise computing system, or a client. The communication connection may include a communication protocol defined by one of web service protocol, a representational state transfer (REST) protocol, an iTalk communication protocol, a hypertext transfer protocol (HTTP), a hypertext transfer protocol secure (HTTPS), a simple mail transfer protocol (SMTP), or a fast common gateway interface (FastCGI) protocol.

In step 708, the IBC describing one of the business entities involved in the communication connection is associated with the defined communication connection. Thus, when the communication connection needs to be established, the IBC describing one of the business entities may be used. In some embodiments, the communication connection and its associated IBC may be stored at the integration layer of the computing system for quick retrieval when the connection needs to be established.

In step 710, the IBC including the unique identifier and at least a portion of the business data attributes, and the defined communication connection are published to a registry that is exposed to a number of applications. In particular, the IBC unique identifier, the name of the business entity associated with the IBC, the type of the business entity associated with the IBC, along with the defined communication connection, may be published to the registry. The registry may be accessible to applications at different computing systems. In some embodiments, the registry may publish the XML data object associated with the IBC. The XML data object may be stored in the internet and the registry may publish the URL for the XML data object.

In some implementations, the IBC may need to be modified or updated to reflect changes of business data attributes associated with the business entity. The integration layer may receive a request to modify the IBC. The integration layer would then verify the request with the application, through the application layer, to confirm the modification. Unless the application confirms the modification, the IBC would not be modified. When the request is verified by the application, the IBC may be modified based on the verification of the request. The verification with the application is to ensure that the IBC modification request is authorized and the IBC would not be manipulated by an external party. Conversely, the application may detect changes of business data attributes associated with the business entity. In this case, the application may notify the changes of business data attributes associated with the business entity to the integration layer. Accordingly, the integration layer may modify the IBC associated with the business entity based on the updated business data attributes.

After the IBC is modified, the updated IBC may be published to the registry, replacing the out-dated IBC, such that the updated IBC may be used in other computing systems. In some embodiments, the registry may send a message to the related computing systems, notifying them that the updated IBC is available. The registry may also send a copy of the updated XML file defining the updated IBC to the computing systems that have request this service.

FIG. 8 illustrates an example method 800 implemented with an IBCR for information exchange between business entities. Method 800 may begin at step 802, when an IBC referenced on a remote business entity computing system is identified through an application on the local business entity computing system. The application may be defined in an application layer of the local computing system. The IBC referenced on the remote computing system may contain a unique identifier associated with the remote business entity located at the remote computing system and a variety of business data attributes, such as name, type, business contacts, descriptions, associated with the remote business entity. The unique identifier may contain a string of numbers, letters, symbols, or a combination of them. The unique identifier and the variety of business data attributes associated with the remote business entity may be defined in an XML data object. In some embodiments, the IBC includes one or more URLs that point to an internet address where the XML data object can be found. The business data attributes may include a unique combination of the name of the remote business entity and the type of the remote business entity.

In step 804, a communication connection between a local business entity and the IBC referenced remote business entity may be identified based on the identification of the IBC. For example, a communication connection may be identified between a sales department of a company in the local computing system and its business partner hosted by a remote computing system. The communication connection may be defined by an on-demand computing system, an on-premise computing system, or a client. The communication connection may include a communication protocol defined by one of web service protocol, a representational state transfer (REST) protocol, an iTalk communication protocol, a hypertext transfer protocol (HTTP), a hypertext transfer protocol secure (HTTPS), a simple mail transfer protocol (SMTP), or a fast common gateway interface (FastCGI) protocol.

In step 806, an IBCR associated with the communication connection may be generated for storage on the local computing system. The IBCR may be generated in an integration layer communicably couple to the application layer in the local computing system. The IBCR contains the same unique identifier as in the IBC and a variety of business data attributes associated with the remote business entity. The unique identifier may be associated to the IBCR through the integration layer of the local computing system.

The business data attributes contained in the IBCR may include distinct elements from the business data attributes contained in the IBC. For example, the IBCR may include usage of the remote business entity in the local computing system, which may not be described in the business data attributes contained in the IBC. For another example, the IBCR may include receiver system assignment of the remote business entity, such that a technical connection may be established, which may not necessarily exist in the IBC. In some embodiments, the business data attributes in the IBCR may include a different type of the remote business entity, compared with the type of the business entity included in the IBC.

In some embodiments, the unique identifier and the business data attributes associated with the remote business entity may be received from a user through the application. The IBCR may then be generated based on receipt of the unique identifier and the business data attributes associated with the remote business entity. The IBCR may be generated by the integration layer of the local computing system, describing the remote business entity.

In some embodiments, the integration layer of local computing system may identify an existing IBCR associated with the IBC. The integration layer may copy the existing IBCR and generate the IBCR associated with the remote business entity based on the existing IBCR. For example, the integration layer may modify certain business data attributes or the unique identifier of the existing IBCR and keep the remaining part of the existing IBCR for generating the IBCR associated with the remote business entity.

In some embodiments, the integration layer of local computing system may identify a registry that stores the unique identifier and a link to the IBC. The integration layer may generate the IBCR based on the unique identifier and the link to the IBC stored in the registry. In some embodiments, the integration layer of the local computing system may have access to the XML data object defining the unique identifier and the business data attributes of the IBC. The integration layer may copy the XML data object of the IBC and generate the IBCR based on the copied XML data object. For example, the integration layer may add usage, assignment, or administrative information of the remote business entity in the copied XML data object to generate the IBCR.

In step 808, the generated IBCR may be stored in a repository communicably coupled to the application. The repository may include a database for IBC or IBCRs relevant to the local computing system. When an updated copy of the IBCR becomes available in the integration layer, the updated IBCR may be stored in the repository in replace of the outdated IBCR, such that the most recent copy of the IBCR associated with the remote business entity may be retrieved from the repository.

FIG. 9 illustrates an example method 900 implemented with an IBC framework for logical receiver determination in association with a set of routing rules. Method 900 may begin at step 902, when a set of routing rules stored in a database of a local business entity computing system is identified. The routing rules may be received through the application of the local computing system prior to being identified. In some embodiments, the set of routing rules may include at least one rule regarding a product type associated with a remote business entity computing system and at least one rule regarding a delivery criteria associated with the remote business entity computing system. The routing rules may be configured and maintained by a local business entity or an application of the local computing system.

In step 904, a request for a business transaction may be received through an application of the local computing system. The business transaction may be a sales order, a purchase order, a shipping order, or any other transaction that involves a remote business entity hosted by a remote business entity computing system. The request for the business transaction may be initiated by a local business entity hosted by the local computing system, such as a sales department, a product department, a customer relationship department, etc.

In step 906, an IBCR associated with a remote business entity hosted by a remote business entity computing system may be determined based on the identified routing rules. The IBCR may include a unique identifier and a variety of business data attributes associated with the remote business entity. The unique identifier and the variety of business data attributes associated with the IBCR may be defined in an XML data object. The IBCR may be determined from a group of IBCRs, each having a unique identifier and associated with a remote business entity computing system. In some embodiments, the local computing system may compare the routing rules to each IBCR associated with a corresponding remote business entity computing system. The local computing system may determine a particular IBCR associated with a particular remote business entity computing system based on the comparison. As a result, the local computing system may identify the particular IBCR associated with the particular remote computing system to a user through the application.

In step 908, a communication connection associated with the IBCR and an IBC associated with a local business entity hosted by the local computing system may be determined. For example, a communication connection may be determined between a business partner hosted by a remote computing system and a sales department of a company in the local computing system. The communication connection may include a communication protocol defined by one of web service protocol, a representational state transfer (REST) protocol, an iTalk communication protocol, a hypertext transfer protocol (HTTP), a hypertext transfer protocol secure (HTTPS), a simple mail transfer protocol (SMTP), or a fast common gateway interface (FastCGI) protocol.

Further, a logical port of the remote business entity computing system may be identified based on the IBCR. The logical port specifies the target entity of the communication connection and may be used to establish connections with the remote business entity associated with the IBCR. In some embodiments, the identified logical port associated with the IBCR may be stored and persisted for future communication connections involving the IBCR.

In step 910, the business transaction between the local computing system and the remote computing system may be initiated through the determined communication connection. At runtime of establishing the communication connection for the business transaction, the recipient computing system may identify the source IBC describing the local business entity, the business connection with the local business entity, and the target IBC describing the remote business entity hosted by the remote computing system. Authentication may be conducted at the recipient computing system, based on the source IBC, the business connection, and the target IBC. For example, the recipient computing system can verify that the business transaction is initiated by the business entity described by the source IBC. Once the business entity initiating the transaction is authenticated, the recipient computing system may notify the application that this transaction is secure, and then, the application layer would proceed with the transaction knowing that the transaction is secure. At this point, the information of the business entities involved in the communication is not necessary to be included in the payload message, as the connection is established and authenticated.

In addition, since the communication connection is established on a business level between two or more business entities, when the technical infrastructure associated with the business entities changes, the communication connection is still valid as only the technical entities at a level below change. One would only need to update the technical assignments or configuration with the IBCs or IBCRs associated with the business entities in this case. The logical communication connections defined by the IBCs or IBCRs remain to be the same. As such, with the IBC framework, change of technical infrastructures requires minimal effort to update the communication connections and becomes much easier to be dealt with.

A number of implementations have been described. Nevertheless, it will be understood that various modifications can be made. For example, other methods described herein besides those, or in addition to those, illustrated in FIGS. 7-9 can be performed. Further, the illustrated steps of methods 700, 800, and 900 can be performed in different orders, either concurrently or serially. Further, steps can be performed in addition to those illustrated in methods 700, 800, and 900, and some steps illustrated in methods 700, 800, and 900 can be omitted without deviating from the present disclosure. Accordingly, other implementations are within the scope of the following claims.

What is claimed is:

1. A method for managing information exchange between business entities, the method comprising:
   identifying a plurality of routing rules stored in a database of a first business entity computing system;
   receiving a request for a business transaction through an application of a plurality of applications of the first business entity computing system;
   determining, based on the identified routing rules, an identifiable business context reference (IBCR) that is one of a plurality of IBCRs, each IBCR associated with a unique business entity computing system of a plurality of business entity computing systems that comprises a second business entity computing system, the determination comprising:
      comparing the plurality of routing rules to the IBCR associated with a corresponding one of the plurality of business entity computing systems,
      determining the IBCR associated with the second business entity computing system based on the comparison, and
      identifying the IBCR associated with the second business entity computing system to a user through the application, the IBCR comprising a unique identifier associated with the second business entity and a first plurality of business data attributes associated with the second business entity;
   determining, based on the identified IBCR, a communication connection associated with the IBCR and an identifiable business context (IBC) associated with the first business entity computing system; and
   initiating the business transaction between the first business entity computing system and the second business entity computing system through the determined communication connection.

2. The method of claim 1, further comprising:
   prior to identifying the plurality of routing rules, receiving the routing rules through the application of the plurality of applications of the first business entity computing system.

3. The method of claim 1, wherein the plurality of routing rules comprise:
   at least one rule comprising a product type associated with the second business entity computing system; and
   at least one rule comprising a delivery criteria associated with the second business computing system.

4. The method of claim 1, further comprising:
   identifying a logical port of the second business entity computing system based on the IBCR.

5. The method of claim 1, wherein the communication connection comprises a communication protocol defined by one of web service protocol, a REST protocol, an iTalk communication protocol, an HTTP protocol, an HTTPS, an SMTP protocol, or a Fast Common Gateway Interface (FastCGI) protocol.

6. The method of claim 1, wherein the unique identifier and the first plurality of business data attributes are defined in an XML data object.

7. A non-transitory computer storage medium encoded with a computer program, the program comprising instructions that when executed by one or more computers cause the one or more computers to perform operations comprising:
   identifying a plurality of routing rules stored in a database of a first business entity computing system;
   receiving a request for a business transaction through an application of a plurality of applications of the first business entity computing system;
   determining, based on the identified routing rules, an identifiable business context reference (IBCR) that is one of a plurality of IBCRs, each IBCR associated with a unique business entity computing system of a plurality of business entity computing systems comprising a second business entity computing system, the determination comprising:
      comparing the plurality of routing rules to the IBCR associated with a corresponding one of the plurality of business entity computing systems,
      determining the IBCR associated with the second business entity computing system based on the comparison, and
      identifying the IBCR associated with the second business entity computing system to a user through the application, the IBCR comprising a unique identifier associated with the second business entity and a first plurality of business data attributes associated with the second business entity;
   determining, based on the identified IBCR, a communication connection associated with the IBCR and an identifiable business context (IBC) associated with the first business entity computing system; and
   initiating the business transaction between the first business entity computing system and the second business entity computing system through the determined communication connection.

8. The non-transitory computer storage medium of claim 7, wherein the operations further comprise:
   prior to identifying the plurality of routing rules, receiving the routing rules through the application of the plurality of applications of the first business entity computing system.

9. The non-transitory computer storage medium of claim 7, wherein the plurality of routing rules comprise:
   at least one rule comprising a product type associated with the second business entity computing system; and
   at least one rule comprising a delivery criteria associated with the second business computing system.

10. The non-transitory computer storage medium of claim 7, wherein the operations further comprise:
    identifying a logical port of the second business entity computing system based on the IBCR.

11. The non-transitory computer storage medium of claim 7, wherein the communication connection comprises a communication protocol defined by one of web service protocol, a REST protocol, an iTalk communication protocol, an HTTP protocol, an HTTPS, an SMTP protocol, or a Fast Common Gateway Interface (FastCGI) protocol.

12. The non-transitory computer storage medium of claim 7, wherein the unique identifier and the first plurality of business data attributes are defined in an XML data object.

13. A system of one or more computers configured to perform operations comprising:
identifying a plurality of routing rules stored in a database of a first business entity computing system;
receiving a request for a business transaction through an application of a plurality of applications of the first business entity computing system;
determining, based on the identified routing rules, an identifiable business context reference (IBCR) that is one of a plurality of IBCRs, each IBCR associated with a unique business entity computing system of a plurality of business entity computing systems comprising a second business entity computing system, the determination comprising:
comparing the plurality of routing rules to the IBCR associated with a corresponding one of the plurality of business entity computing systems,
determining the IBCR associated with the second business entity computing system based on the comparison, and
identifying the IBCR associated with the second business entity computing system to a user through the application, the IBCR comprising a unique identifier associated with the second business entity and a first plurality of business data attributes associated with the second business entity;
determining, based on the identified IBCR, a communication connection associated with the IBCR and an identifiable business context (IBC) associated with the first business entity computing system; and
initiating the business transaction between the first business entity computing system and the second business entity computing system through the determined communication connection.

14. The system of claim 13, wherein the operations further comprise:
prior to identifying the plurality of routing rules, receiving the routing rules through the application of the plurality of applications of the first business entity computing system.

15. The system of claim 13, wherein the plurality of routing rules comprise:
at least one rule comprising a product type associated with the second business entity computing system; and
at least one rule comprising a delivery criteria associated with the second business computing system.

16. The system of claim 13, wherein the operations further comprise:
identifying a logical port of the second business entity computing system based on the IBCR.

17. The system of claim 13, wherein the communication connection comprises a communication protocol defined by one of web service protocol, a REST protocol, an iTalk communication protocol, an HTTP protocol, an HTTPS, an SMTP protocol, or a Fast Common Gateway Interface (FastCGI) protocol.

18. The system of claim 13, wherein the unique identifier and the first plurality of business data attributes are defined in an XML data object.

* * * * *